Nov. 22, 1955 J. M. SHAHEEN ET AL 2,724,478
APPARATUS FOR VENDING INSURANCE POLICIES
Filed July 14, 1951 4 Sheets-Sheet 3

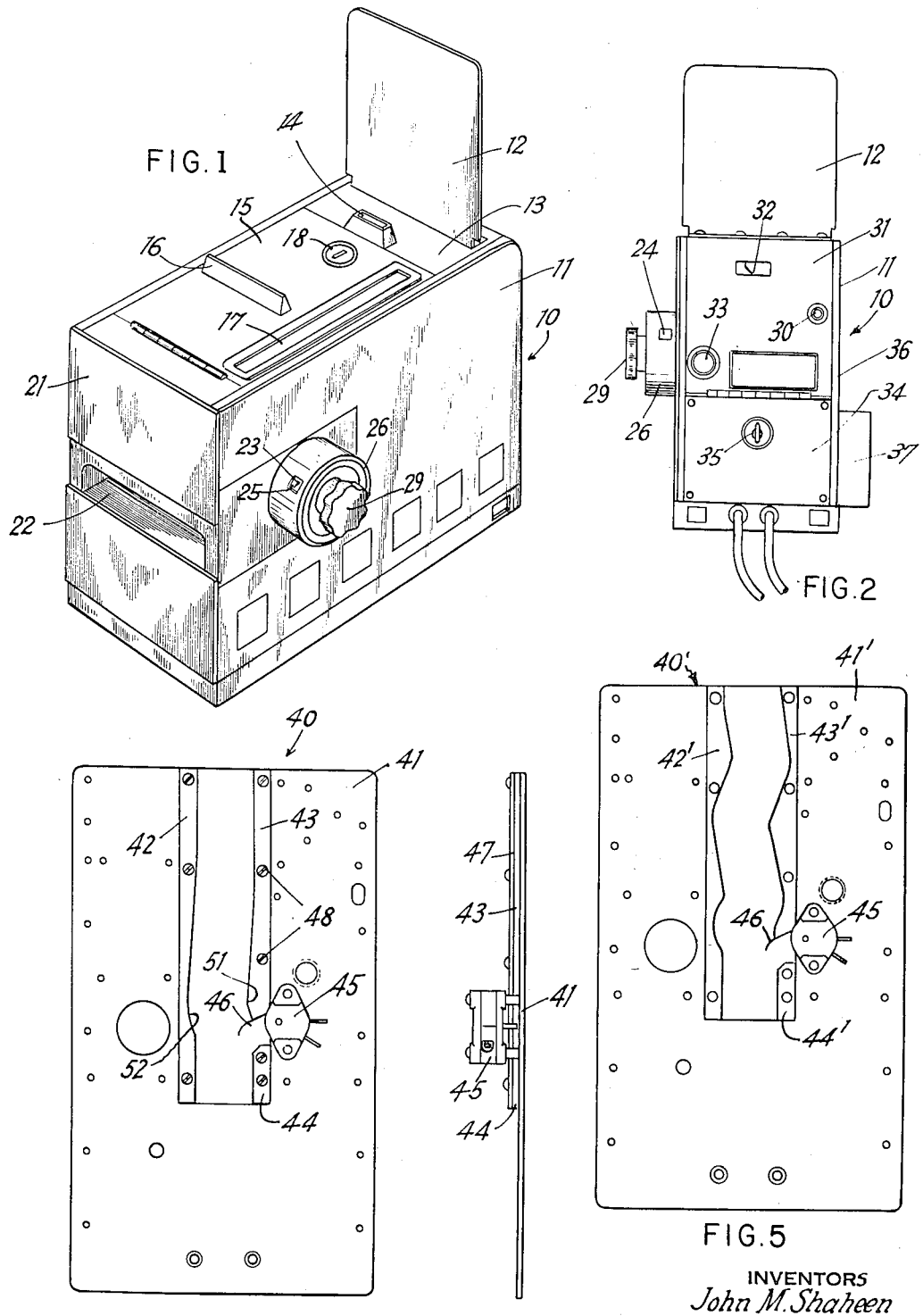

INVENTOR
John M. Shaheen
BY Philip Gandert
Alfred Gage
ATTORNEY

Nov. 22, 1955  J. M. SHAHEEN ET AL  2,724,478
APPARATUS FOR VENDING INSURANCE POLICIES
Filed July 14, 1951  4 Sheets-Sheet 4

INVENTOR
John M. Shaheen
BY Philip Gandert
Alfred Page
ATTORNEY

United States Patent Office 2,724,478
Patented Nov. 22, 1955

2,724,478

APPARATUS FOR VENDING INSURANCE POLICIES

John Michael Shaheen and Philip Gandert, New York, N. Y., assignors, by mesne assignments, to Tele-Trip Policy Company, Inc. of Delaware, a corporation of Delaware Application July 14, 1951, Serial No. 236,708

1 Claim. (Cl. 194—9)

This invention relates to vending and, more particularly, to a novel apparatus, novel method, and novel format for automatically vending insurance. More specifically, the invention is directed to the automatic vending of accident insurance for selected, predetermined periods of coverage with the use of coin operated vending apparatus.

Accident insurance for travelers is commonly sold at the ticket windows of airline, railroad, and bus terminals. For a specified premium, the traveler obtains a set amount of coverage for a predetermined number of days. Such insurance is usually purchased at the same time that the transportation is bought. The time necessary for the traveler and the ticket agent to make out the necessary forms, determine the amount due, make change, etc., results in considerable delay and annoyance, particularly to other ticket buyers who may be waiting in line. These delays are particularly annoying at airline terminals where the agent has not only to sell the ticket but also to check reservations, baggage weights, etc.

In accordance with the present invention, a method and apparatus for vending such insurance, and a novel policy form, are provided in which the delay is reduced to a minimum or substantially eliminated. In addition, the time and effort required of the agent in issuing the policy is practically nil, and may be eliminated entirely. At the most, the agent need only countersign a completed form and press a validating button on the vending apparatus.

A feature of the invention is that the policy may be sold at places other than transportation offices and terminals, such as in hotels, telegraph and telephone offices, etc., and the policy may be sold in advance of its effective date.

To this end, a multiple folded policy form is provided so folded as to provide two end pages overlapping each other in such manner as to resemble, for example, pages 1, 2 and 3 of a bound pamphlet or the like. The outer page is joined to the other folds by a perforated section so that it forms an easily removable stub. When the stub is torn off, the opposite end page becomes the outer or face page of the policy. This latter page has a format identical with that of the initial outer page, such format including instructions to the policy holder, blanks for the issue date, number of days coverage, and name and address of insured, and a serial number.

The back surface of the initial outer page is blank and carries suitable transfer material, such as carbon paper, for example, underlying the blank spaces on its face and correspondingly overlying the blank spaces on the other end page. Thus, in the folded condition of the policy, any data written or stamped in the blank spaces of the first page is automatically copied in the blank spaces of the underlying end page. The initial and detachable front page forms a stub for the records of the issuing agent and the insurance company. The intermediate pages or folds of the policy have the desired insurance provisions printed thereon.

In accordance with the invention method, a plurality of policy forms are disposed in a rack on the wall of a coin operated policy validating machine or policy vendor. This machine contains a time stamp unit mounted near its forward end and having an opening for insertion of the filled out policy into the unit. The vendor has a coin chute by means of which the necessary number of coins (quarters) may be inserted corresponding to the desired period of insurance coverage. The inserted coins actuate counters, one of which operates a visible indicator of the number of coins deposited and the related number of days insurance coverage. The other counter registers the total number of coins deposited over any given period of time.

To obtain insurance coverage, the purchaser takes a blank policy and fills in the required data in the blanks, including the date it is desired the coverage begin if such date is other than the date of purchase. The purchaser then takes the policy to the vendor, deposits the required number of coins in the latter, and inserts the policy into the time stamp unit. The agent observes the coin indicator to determine if the right kind and right number of coins have been inserted for the coverage period. Insertion of the policy into the time stamp unit closes one of two series connected switches in a control circuit for the unit. If the indicator reads correctly, the agent pushes a validating button to close the other switch.

The time stamp unit then operates to imprint the time and date of purchase, and the number of days coverage in the proper blank spaces on the stub, this data, as well as the information written in by the purchaser, also being copied onto the underlying end fold or page. The validation operation also controls circuits effecting a re-setting of the coin indicator counter. The validated policy is then signed by the agent, the stub detached and dropped through a stub slot, and the remainder of the policy form given to the insured.

The machine is so constructed that the time stamp unit may be readily disconnected therefrom for inspection, repair, resetting, or changing of typing ribbons. An indicator of power failure, and suitable re-set means are also provided. The vendor mechanism is enclosed in a compact casing designed to occupy minimum space on the agent's counter, and the stub and coin receptacles are locked in the machine so that they can be removed only by an authorized person having the proper keys.

For a complete understanding of the invention principles, reference is made to the following detailed description of a typical embodiment thereof as illustrated in the accompanying drawings. In the drawings:

Fig. 1 is a perspective view of the coin operated policy vendor.

Fig. 2 is a rear elevation view thereof.

Fig. 3 is a front elevation view of a coin chute for A. C. operation of the vendor.

Fig. 4 is a side elevation view of a coin chute of Fig. 3.

Fig. 5 is a front elevation view of a coin chute for D. C. operation of the vendor.

Fig. 8 is a perspective view of the completely folded policy form.

Fig. 9 is a perspective view of the policy form partly unfolded to illustrate the back of the front fold and the underlying end fold.

Figure 6:
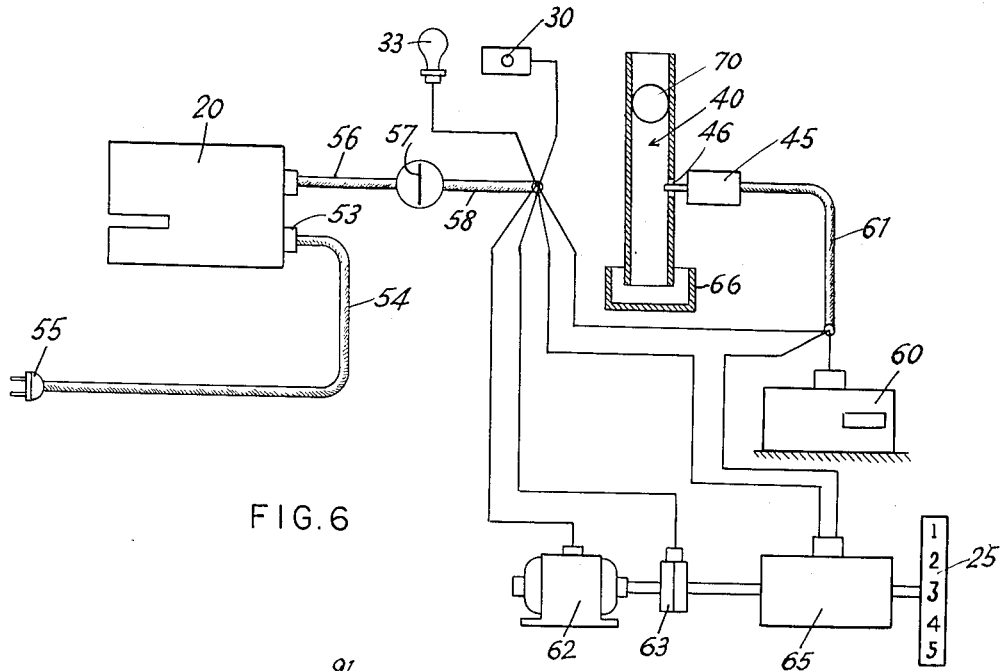
Fig. 6 is a schematic view of the ventor elements.

For a clearer understanding of the invention, the coin operated validating unit or vendor will be described first. Referring to Figs. 1 and 2, the vendor 10 is enclosed in a suitable casing 11 of small dimensions so as not to occupy more counter space than the minimum necessary. For example, the overall dimensions of the illustrated casing may be 5½" x 11¾" x 9¾". An advertising sign 12 on the upper wall 13 of the casing may extend vertically an additional 6".

Just forwardly of sign 12, wall 13 carries a coin slot 14 leading to a coin chute of the type shown in Figs. 3 and 4, or in Fig. 5. A hinged cover 15 carrying an information sign or standard 16 has a slot 17 for receiving policy stubs and allows access to the stub container (not shown) by unlocking lock 18, the agent having a key for this purpose.

The forward wall 21 of casing 11 has an opening 22 by means of which the policy may be inserted into a time stamp unit enclosed in the forward part of casing 11. This unit, shown schematically at 20 in Fig. 6, may be a commercial time stamp unit arranged to print the date and time, and having an additional printing wheel connected to a dial 25 in a housing 26 on the side wall 27 of casing 11. Housing 26 has substantially diametrically opposite apertures 23 and 24 for viewing dial 25 from the front and rear of casing 11. A manual setting knob 29 is provided for the dial.

On the rear or agent's wall 31 of casing 11 is an aperture 32 exposing a totalizing dial indicating the total number of coins deposited for any period of time. Below aperture 32 is a "print" and "re-set" button 30 which the agent must press to validate a policy inserted in slot 22. Also on wall 31 is a lamp 33 which lights when a power failure has occurred and the power has been restored, to advise the agent to re-set the synchronous timing mechanism of time stamp unit 20. The lower part of wall 31 includes a hinged door 34 with a lock 35, for access to the coin receptacle. The opposite side wall 36 of casing 11 has a rack 37 for holding policy forms.

The coin chute 40 used with the vendor for A. C. operation is illustrated in Figs. 3 and 4 as comprising a main mounting plate 41 to which are secured left guide strip 42 and upper and lower right guide strips 43 and 44 spaced to provide a slot for the operating arm 46 of a switch 45 mounted on plate 41. A transparent cover, suitably of plastic material, is secured to the guide strip by screws 48. The inner edge of strip 43 slopes inwardly and then outwardly immediately above arm 46, as at 51, the inner edge of strip 42 being correspondingly recessed or concaved at 52. This tends to throw the coin toward arm 46 to insure positive operation of switch 45.

Fig. 5 illustrates a coin chute 40' for D. C. operation. In this case, the inner edges of guide strips 42' and 43' are designed to provide a zig-zag path for the coin to slow the operation, due to slower response of the control circuits with D. C. energization. In chute 40', as in chute 40, the strip edges adjacent the switch arm 46 are designed to force the coin toward arm 46 to assure positive switch operation.

With both chutes, the coin, preferably a quarter, falls by gravity along the chute, operates the switch arm, and then is discharged into a suitable coin receptacle (not shown). The actuation of switch 45 effects control operations which will be explained with reference to Figs. 6 and 7.

Referring to the latter figures, the time stamp unit 20, upon insertion in the machine, has a connector engaging a mating connector 53 on a utensil cord 54 having a plug 55 for connection to a suitable receptacle. A multi-conductor cable 56 connects unit 20 to one-half of a two part connector 57. The other half of the two part connector is connected by a multi-conductor cable 58 to the counters, switch 45 and other elements of vendor 10.

The totalizing counter is indicated at 60 as connected through a multi-conductor cable 61 to switch 45. The re-set counter 65 controlling dial 25 is also indicated as connected to switch 45 by cable 61, and is further connected by cable 58 to connector 57. Push button 30 and lamp 33 are connected by cable 58 to connector 57. Counter 65 is schematically indicated as operated by a motor 62 through a magnetically released, normally engaged clutch 63, the counter returning to zero when the clutch is disengaged.

Figures 8, 9:
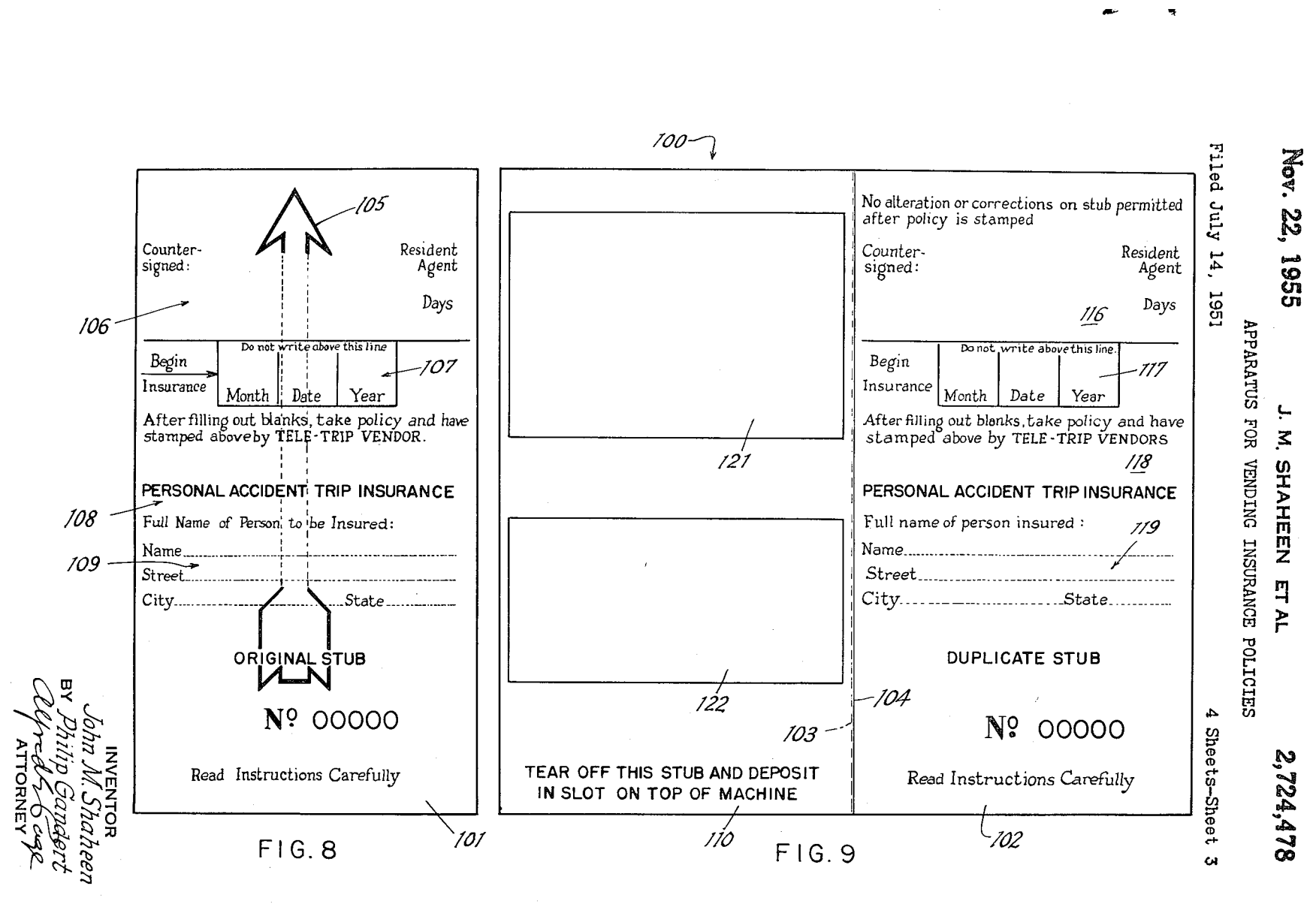

The coin controlled elements operate in the following manner, and as described more in detail in connection with Fig. 7. When the policy form of Fig. 8 is placed in slot 22 of unit 20, it closes a control switch, connected in series with push button 30, and controlling the operation of unit 20. Coins 70 falling through chute 40 operate arms 46 to close switch 45, the number of impulses equalling the number of coins. The coins are collected in receptacle 66.

Each impulse of switch 45 steps counters 60 and 65 one unit, so that counter 60 registers the total number of coins and dial 25, visible to both the purchaser and the agent, likewise indicates the number of coins. When the agent has checked dial 25 to determine if the correct number of coins has been deposited, he presses button 30 to complete the operating circuit for unit 20 which stamps the date, time, and number of days coverage on the policy form. At the same time, the coil of clutch 63 is energized to disconnect the clutch and counter 65, being released from motor 62, returns dial 25 to zero. The apparatus is now ready for another validation.

Figure 7:
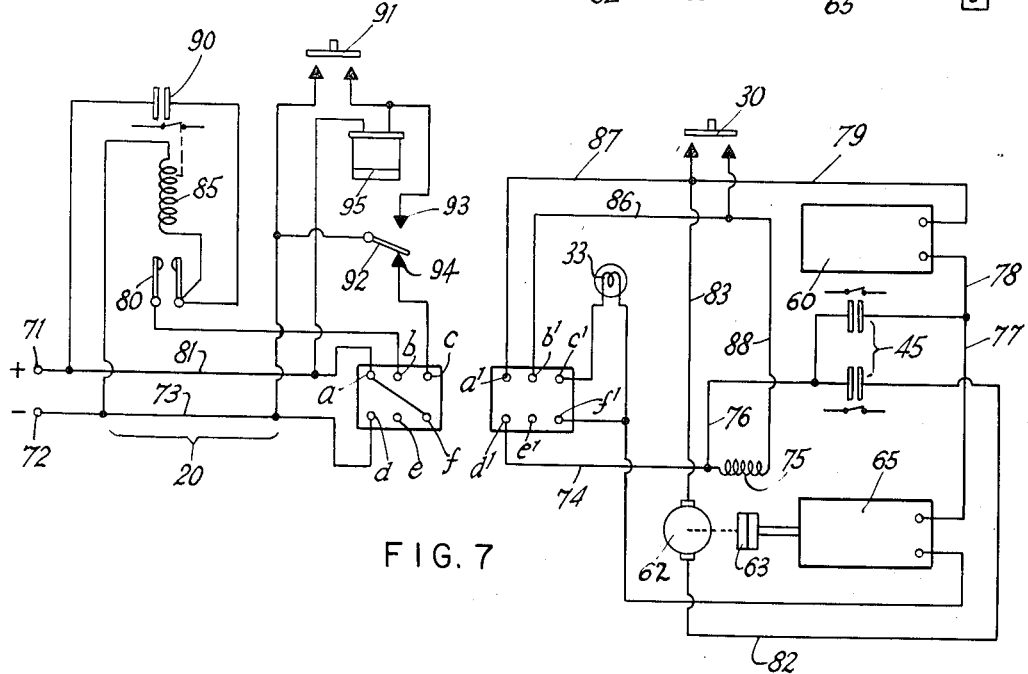
Fig. 7 is a schematic wiring diagram of the vendor control and operation circuits.

The schematic wiring diagram is shown in Fig. 7, the vendor being indicated as energized from terminals 71, 72 which, for convenience, have been designated as "plus" and "minus," although they are usually A. C. terminals. Terminal 71 is connected to contact $a$ of connector 57, this contact being cross connected to contact $f$ so that both contacts are "plus." Terminal 72 is connected to contact $d$ of connector 57 so that this contact is "minus." The mating contacts of connector 57 are designated by corresponding letters primed.

Switch 45, shown as a dual contact switch, has its contacts connected to terminal 71 as follows: terminal 72, conductor 73, contacts $d$ and $d'$, conductors 74 and 76. When switch 45 is operated by a coin, counters 60 and 65 are connected to terminal 72 by conductors 77, 78. Counter 60 is connected to "plus" terminal 71 through conductor 79, contacts $a'$ and $a$, and conductor 81. Switch 45 also connects motor 62 to terminal 72 through conductor 82, the motor being connected to terminal 71 through conductor 83 connected to conductor 79. Thus, the two counters and motor 62 are energized at each closure of switch 45.

When the policy form is placed in slot 22, it closes contacts 80 in series with the time stamp unit operating coil 85 connected by conductors 84 and 73 to terminal 72. Coil 85 is schematically indicated as closing unit operating contacts 90 across terminals 72 and 71. Contacts 80 are connected, through contacts $b$ and $b'$ and conductor 86, to one terminal of push button 30, the other push button terminal being connected to contact 71 through conductor 87, contacts $a'$ and $a$ and conductor 81.

Thus, with contacts 80 closed by the policy form, when push button 30 is operated, coil 85 is energized to activate the unit 20. At the same time, clutch disengaging coil 75 is energized over conductors 88 and 74. The released counter 65 then re-sets dial 25 to zero.

A power failure indicator is provided comprising relay 95 connected across conductors 73, 81 through push button 91. When the relay is energized, it holds through engagement of its armature 92 with front contact 93. Should power fail, relay 95 drops armature 92 to engage back contact 94 connected to indicator lamp 33, which is connected to the other power terminal, through contacts $f'$ and $f$. Thus, when power is restored, lamp 33 lights to apprise the agent that the time stamp unit must be re-set to the correct time. After such re-setting, the agent presses button 91, inside casing 11, to pick up relay 95 which closes its own holding circuit. Of course, the apparatus will not operate if it is attempted to use it during a power failure.

The policy form 100 is shown in Figs. 8 and 9, and comprises an elongated strip folded on itself and then re-folded to provide a front sheet 101 overlying an end sheet 102. Front sheet 101 forms a stub removable by tearing along perforations 103 adjacent the fold line 104 of end sheet 102. Front sheet 101 has an arrow 105 imprinted thereon to indicate the direction of insertion in slot 22.

A blank space 106 for the validation and agent's counter-signature is provided near the top of page 101, and a similarly located, identically printed space 111 is provided on end sheet 102. Below spaces 106 and 116 are blanks 107, 117 for writing in the starting date of the policy, if a future date is desired. Beneath blanks 107, 117 are instructions 108, 118 followed by blanks 109, 119 for the insured's name and address.

The back 110 of page 101 contains transfer material, such as carbon strips 121, 122 respectively underlying spaces 106 and 109. Strips 121, 122 likewise overlie spaces 116, 119 when sheet 101 is folded on sheet 102. Consequently, the information written and stamped in space 106, and that written in space 109, are correspondingly written in spaces 116 and 119.

In the invention method, the purchaser takes a blank 100 from rack 37, fills in the data in spaces 107, 109 and then hands the blank 100 to the agent for his counter-signature. The purchaser then deposits the required number of quarters in slot 14, and these are registered on dial 25. The blank 100 is then inserted fully in slot 22, and the agent, after checking dial 25 to see if the amount paid is correct, pushes button 30, as described to validate the policy. Stub sheet 101 is then torn off and deposited in slot 17, the insured keeping the remainder of form 100. The pages of this form, other than pages 101, 102, 110 have the policy terms printed thereon.

Due to the width of chutes 40, 40', plus the recesses opposite switch arm 46, only the required type of coins may be used. The chutes will not take larger coins, and smaller coins will pass arm 46 without operating the same.

The selector mechanism and indicator dial of Figs. 10 through 13 may be substituted for the time stamp operated dial and the counters of the arrangement just described. The selector mechanism includes a shaft, a stepping magnet operated by coin initiated impulses, a release magnet operated by the validating button, and a dial marked on one face to indicate the number of days insurance and, on the other face, to indicate the number of quarters deposited.

Figure 10:
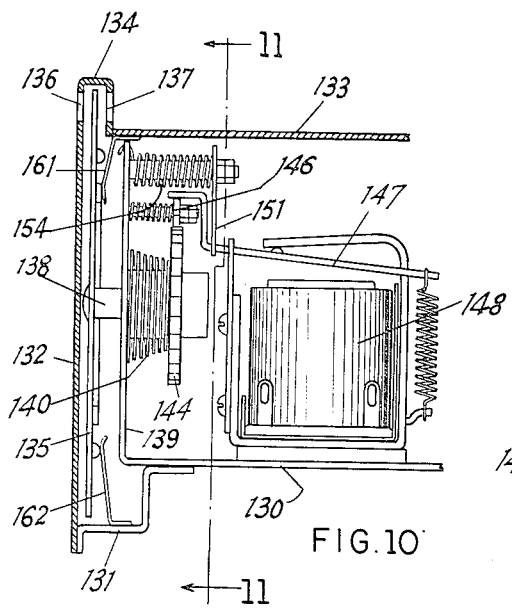
Fig. 10 is a side elevation view, partly in section, of a selector mechanism and associated indicator dial which may be used with the vendor.
Figure 11:
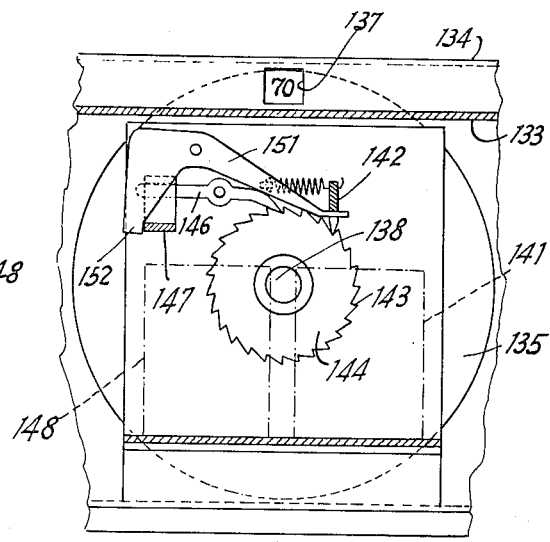
Fig. 11 is a view on the line 11—11 of Fig. 10.

Referring to Figs. 10 and 11, the mechanism includes a frame 130 which is supported by a bracket 131 on the front wall 132 of the vendor casing. The upper wall 133 of the casing has a U-shaped offset 134 in which are aligned apertures 136, 137. Offset 134 receives the edge of a dial 135 carrying "days of insurance" and "number of quarters" indicia on either surface near the periphery.

Dial 135 is secured to the outer end of a shaft 138 which is rotatably mounted in upright arm 139 of frame 130. A spring 140 biases shaft 138 in a counter-clockwise direction as viewed in Fig. 11, suitable stop means (not shown) limiting such movement.

Shaft 138 is stepped clockwise by a magnet 141 having an armature 142 engageable with the teeth 143 of a ratchet wheel 144 secured to shaft 138. Each time magnet 141 is energized, as by closure of the coin chute switch 45, wheel 144 is stepped one position clockwise, tensioning spring 140.

Retrograde movement of wheel 144 is prevented by a spring biased, releasable latch 146 engageable with teeth 143. Latch 146 is operated by the armature 147 of release magnet 148 which is energized when validating button 30 is depressed. Associated with armature 147 is a spring biased lock bar 151 arranged to hold the armature in its "down" position, bar 151 having a rear end 152 engageable with armature 147 when armature 142 is released. The forward end of bar 151 extends beneath armature 142 so that bar 151 is rocked clockwise, to release armature 147, when magnet 141 is energized. When so rocked, arm 151 is locked against reverse movement, by its biasing spring 154 which tends to turn arm 151 in a counterclockwise direction, due to blocking of end 152 by armature 147.

Figure 12:
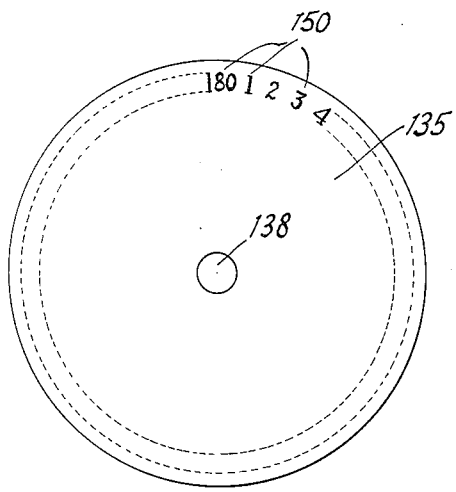
Figs. 12 and 13 are views of the opposite faces of the indicator dial.
Figure 13:
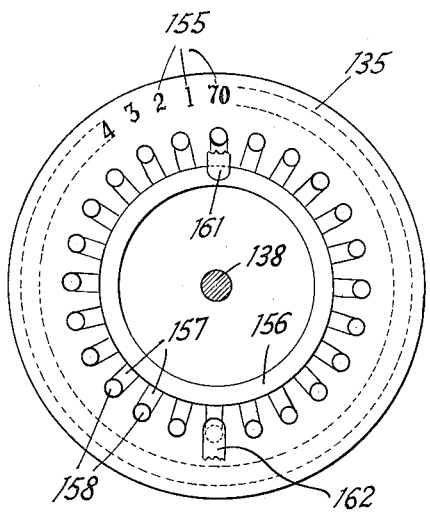

Dial 135 carries, on its forward face, indicia 150 exposed through aperture 136 to indicate the days of insurance paid for, as shown in Fig. 12. On its rear face, dial 135 carries indicia 155 indicating the number of quarters deposited, as seen in Fig. 13. The rear face of the dial also carries a circular conductive strip 156 connected by strips 157 to contacts 158 which are arranged in spaced relation around the circumference of a circle. Brushes 161, 162 engage strip 156 and contacts 158, respectively, and are connected in the impulsing circuit of the time stamp 20.

Each time a coin is deposited, magnet 141 is energized to pull armature 142 down and advance wheel 144 one step. This rocks latch 151 clockwise to release armature 147 which, in turn, blocks latch 151 from return movement. Latch 146 holds wheel 144 in its advanced position. Also, each time the wheel is advanced one step, brush 162 engages a succeeding contact 158 to step time stamp 20. When validating button 30 is depressed, magnet 148 is energized to pull armature 147 which releases latches 146 and 151. Release of latch 146 allows spring 140 to return wheel 144 to the zero position (shown in Fig. 11). Latch 152 locks armature 147 down to maintain latch 146 released during the wheel return movement.

While specific embodiments of the invention have been shown and described in detail to illustrate the application of the invention principles, it should be understood that the invention may be otherwise embodied without departing from such principles.

What is claimed is:

Coin operated validating apparatus comprising, in combination, an electrically operated time stamp unit of the type having a slot to receive a paper to be validated and normally open control contacts closed by the insertion of the paper; a coin chute; switch means associated with said chute and having operating means for operation by coins passing through the chute; a pair of counters controlled by impulses from said switch means, one of said counters being biased to re-set to zero; means normally effective to retain said one counter in its operated position; a visual indicator dial controlled by said one counter; a manually operable switch in series with said normally open contacts; means for operating said one counter including a motor and a magnetically released clutch associated therewith; whereby a paper inserted into said unit is not validated until said manually operable switch is operated to complete the energizing circuit for said unit; and means including an energizing circuit for said clutch releasing mechanism controlled by said manually operable switch and responsive to said validation to release said retaining means to re-set said one counter.

References Cited in the file of this patent

UNITED STATES PATENTS

| | | |
|---|---|---|
| 1,100,724 | Gibbs | June 23, 1914 |
| 1,719,497 | Bell | July 2, 1929 |
| 2,019,301 | Friden | Oct. 29, 1935 |
| 2,235,259 | Juhl | Mar. 18, 1941 |
| 2,251,073 | Shann | July 29, 1941 |
| 2,257,949 | Gruettner | Oct. 7, 1941 |
| 2,266,825 | Streckfuss | Dec. 23, 1941 |
| 2,328,858 | Sweetland | Sept. 7, 1943 |
| 2,612,976 | Harper | Oct. 7, 1952 |